June 3, 1952     M. J. BOHNENBLUST     2,599,366
COMBINE AND TRANSPORT DOLLY THEREFOR Filed Sept. 3, 1949     2 SHEETS—SHEET 1

Inventor
Martin J. Bohnenblust
By Fishburn & Mullendore
Attorneys

June 3, 1952     M. J. BOHNENBLUST     2,599,366
COMBINE AND TRANSPORT DOLLY THEREFOR
Filed Sept. 3, 1949     2 SHEETS—SHEET 2
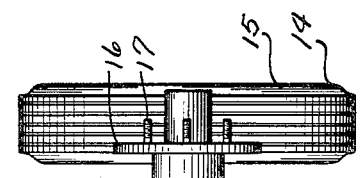
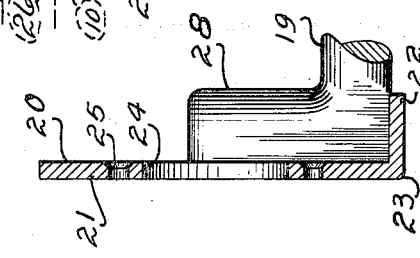
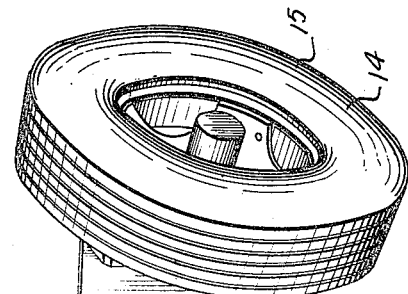
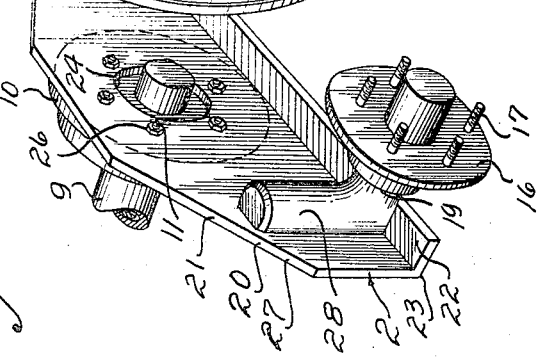
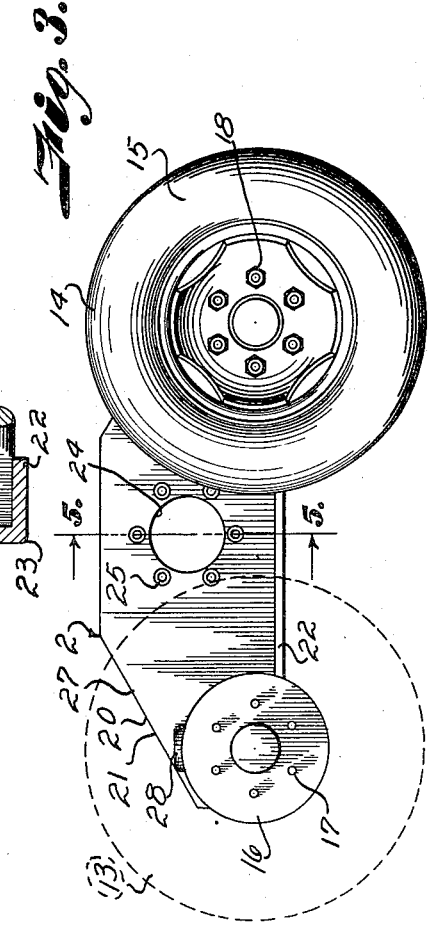
Inventor
Martin J. Bohnenblust
By Fishburn & Mullendore
Attorneys Patented June 3, 1952

2,599,366

UNITED STATES PATENT OFFICE 2,599,366

COMBINE AND TRANSPORT DOLLY THEREFOR

Martin J. Bohnenblust, Minneapolis, Kans.

Application September 3, 1949, Serial No. 113,937

1 Claim. (Cl. 280—61)

This invention relates to combines and transport dollies therefor and more particularly to dollies for use on combines of the self-propelled type for facilitating transportation of the combine along highways and the like.

It is common practice during the wheat harvest time for owners of combines to follow the harvest, that is start in the southern part of the country and work north combining wheat in various farms on a contract basis. The combines are moved to a farm, placed in operation and the wheat combined. After the wheat on the farm has been combined, the combine is pulled down the highway until the owner of the combine can find another farm which will hire him to combine the wheat. The combine owner usually uses a truck for carrying supplies and equipment and since the self-propelled combines are too large to load on such trucks, it is customary to tow same behind the truck. The platform, reel and cradle are usually removed and placed on the truck to reduce the over-all width of the machine moving down the highway. Even though towing the combine reduces the wear compared to what it would be if the combine operated under its own power down the highway and increases the permissible speed of movement, the rotation of the traction wheels does wear the axle mechanism and combine. Also the shocks created by travel over rough roads and lack of springs materially shorten the life of the combine.

The objects of the present invention are to provide a transport dolly for self-propelled combines for eliminating rotation of the driving axle of said combine and wear of the parts thereof; to provide a combine with dollies which replace the traction wheels, said dollies having tandem arrangement of wheels and a rocking action in passing over rough areas thereby reducing the shock to the combine; to provide a tandem wheel dolly so mounted as to use the combine axle as a pivotal mounting which reduces the shock on the combine without the use of springs and the like; and to provide a simple, sturdy, dolly structure which may be quickly and easily placed on a combine and removed therefrom whereby said combine may be speedily transported from one area to another and placed in operation with a minimum of lost time and wear and tear on said combine.

In accomplishing these and other objects of the present invention, I have provided improved details of structure, the preferred form of which is illustrated in the accompanying drawings wherein:

Fig. 2 is a perspective view of a dolly mounted on the rear axle of a combine, one of the dolly wheels being removed to better illustrate the mounting therefor.

Fig. 3 is a side elevation of the dolly with one of the wheels removed.

Fig. 4 is an end elevation of the dolly with one wheel removed.

Fig. 5 is a partial sectional view through the dolly on the line 5—5, Fig. 3.

Figure 1:
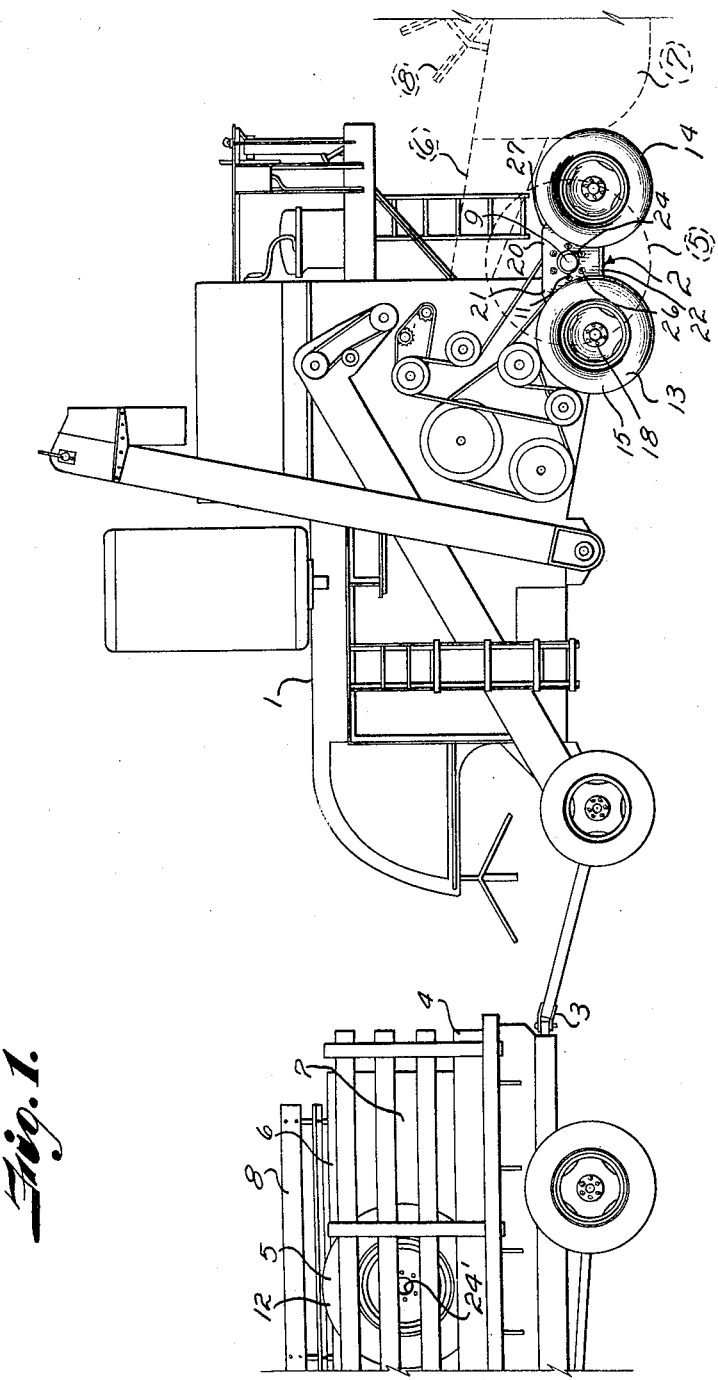
Fig. 1 is a side elevation of a combine having transport dollies mounted thereon, said combine being towed by a truck down a road.

1 designates a combine of the self-propelled type with dollies 2 thereon for transportation of the combine along a highway or the like. The combine as shown in Fig. 1 is provided with a hitch 3 for connection with a truck 4 for towing the combine. The combine when in position for performing combining operations has traction wheels 5, platform 6, cradle 7 and reel 8 in the positions shown in dotted lines on the combine in Fig. 1. In order to reduce the width and apply the dollies 2, the traction wheels 5, platform 6, cradle 7 and reel 8 are removed from the combine and placed on the truck 4. The driving axle 9 of the combine has hubs 10 at the ends thereof with a conventional bolt circle having studs 11 for securing the traction wheels 5, thereon, said wheels usually having large pneumatic tires 12.

The dolly 2 consists of spaced wheels 13 and 14 preferably having pneumatic tires 15 mounted thereon, said wheels being mounted on hubs 16 by means of studs 17 and nuts 18 or other suitable fastening devices. The hubs 16 are rotatably mounted on antifriction bearings or the like on spindles 19 suitably secured in spaced relation on a frame or plate 20. The frame 20 preferably consists of a plate 21 arranged in a vertical plane and having a flange 22 turned outwardly on the lower edge 23 of the plate, said flange underlying the spindles 19 to aid in supporting the spindles and also to add strength to the frame 20. On an intermediate line between the wheels 13 and 14 the plate 21 is provided with an aperture 24 the same size as the central aperture 24' of the wheels 5 to pass over projecting portions of the hub 10. Arranged around the aperture 24 is a plurality of countersunk holes 25 on a bolt circle corresponding to the bolt circle of the hub 10 whereby the studs 11 may be inserted through the holes 25 and nuts 26 threaded thereon to secure the frame 20 to the hub 10.

It is preferable that the wheels 13 and 14 and the pneumatic tires 15 thereof be smaller than the traction wheels 5 and pneumatic tires 12 of the combine. Therefore the axis of the aperture 24 is preferably spaced vertically from the horizontal plane defined by the axis of the spindles 19 as illustrated in Fig. 3. The vertical height of the plate 21 is slightly greater than the diameter of the hub 10, and the upper edges of the plate 21 are preferably sloped as at 27 towards the edge thereof to reduce the weight and enhance the appearance of the plate.

While the spindles 19 may be secured to the frame 20 in any suitable manner, it is preferable that they rest on the flange 22 and have an upwardly turned portion 28 engaging the outer face of the plate 21 and be secured thereto by welding or the like.

In using a device constructed as described for the transportation of a combine, the rear axle 9 of the combine is jacked up, the nuts 26 removed from studs 11 and the wheels 5 removed from the hubs 10 and placed on the truck 4. The dollies 2 with the wheels 13 and 14 thereon are moved in position to align the holes 25 in the plate 21 with the studs in the hubs 10. The nuts 26 are then applied to the studs to draw the plates 21 against the flanges of the hubs 10 to rigidly secure said plates to the hubs. The jacks are then removed from the axle 9 to lower same whereby the pneumatic tires 15 engage the ground. The hitch 3 is connected to the truck 4 and the combine is ready for the truck to tow same along the highway. In the towing operation the combine gears are placed in neutral so the axle shaft is free to turn, then as the combine is moved over rough roads the tandem arrangement of the wheels 13 and 14 allows same to follow the surface by rocking the shaft in the axle bearings of the combine. This rocking action reduces the shock to the combine and permits higher speeds in moving same on roads. Upon reaching the location of the next combining operation, the hitch 3 is disconnected from the truck and the wheels 5 removed therefrom, the rear axle 9 and the combine 10 jacked up, the nuts 26 removed from the studs, whereby the dollies may be removed from the hubs 10 and the wheels 5 placed on the hubs with the apertures therein aligning with the studs 11, and the nuts threaded on said studs to rigidly secure the wheels 5 to the combine. The platform 6, the cradle 7 and reel 8 are then replaced on the combine and the combine is ready for self-propelled operation through the wheat fields.

It is believed obvious that I have provided a simple, efficient dolly which may be applied to a self-propelled combine for transportation of same along a highway wherein the limited rotation of the dollies about the axis of the rear axle will cushion the shock due to irregularity of the surface over which the combine is transported.

What I claim and desire to secure by Letters Patent is:

A dolly for replacing a traction wheel of a self-propelled combine for transportation thereof, said combine having a source of power, a driving axle connectible with the source of power and hubs on the driving axle with devices thereon for normally mounting and securing traction wheels thereto, said driving axle being free to rotate when disconnected from the source of power, comprising an elongated plate having apertures centrally located therein adapted to align with said devices on a driving axle hub and be rigidly secured to the hub thereby for rotation with the axle, said plate being substantially perpendicular to the axis of the axle and extending forwardly and rearwardly of said axle in line with the direction of travel of the combine, a flange on the plate spaced from said apertures thereof and coextensive with the length of said plate, said flange extending laterally and outwardly from the plate, parallel spindles resting on the flange and fixed to the flange and plate and extending laterally and outwardly therefrom, said spindles being equally spaced from and parallel to the axis of the driving axle, a hub rotatably mounted on each spindle, and wheels having pneumatic tires removably secured to each hub on the spindles for supporting the combine axle at substantially the same height as normally provided by the traction wheels, said wheels being on a plane parallel to the plate in tandem relative to the direction of travel of the combine whereby rotation of the combine axle in response to vertical movement of the wheels in following contours of road surfaces will cushion road shocks to the combine.

MARTIN J. BOHNENBLUST.

REFERENCES CITED

The following references are of record in the file of this patent:

UNITED STATES PATENTS

| Number | Name | Date |
| --- | --- | --- |
| 1,067,934 | Martin | July 22, 1913 |
| 1,650,031 | Nash | Nov. 22, 1927 |

FOREIGN PATENTS

| Number | Country | Date |
| --- | --- | --- |
| 242,477 | Switzerland | Oct. 1, 1946 |